M. CHANDLER.
Horse Hoe.
No. 34,128.
Patented Jan'y 14, 1862.
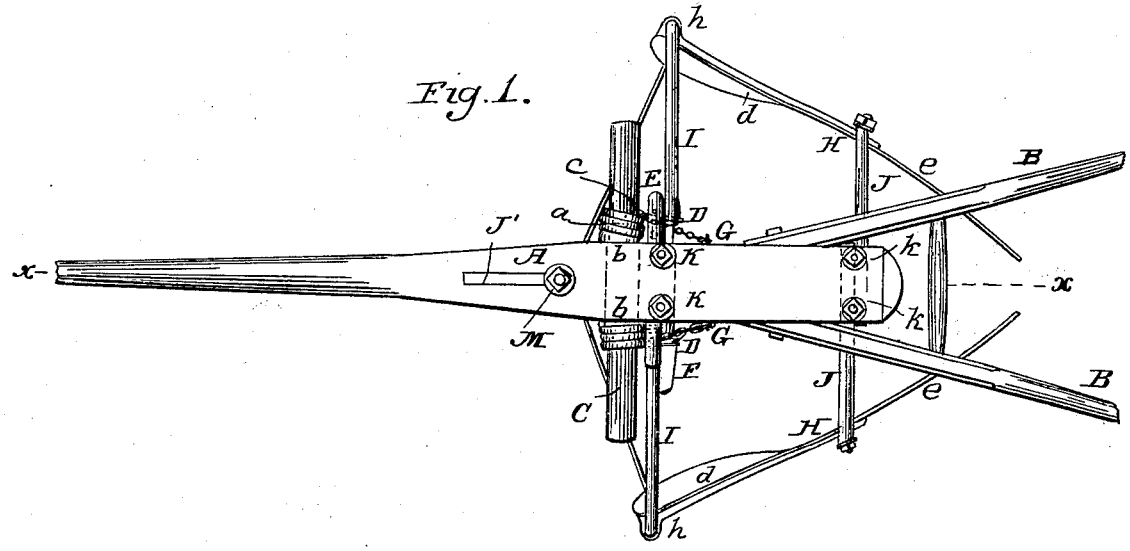
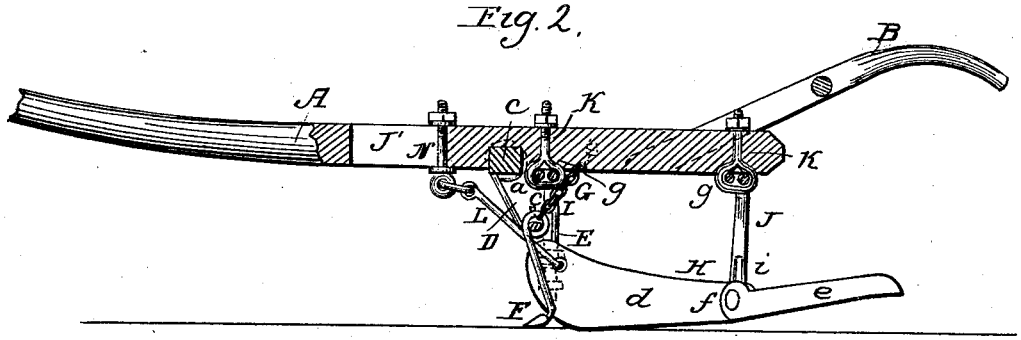
Witnesses:
Inventor:
Moses Chandler

UNITED STATES PATENT OFFICE.

MOSES CHANDLER, OF EAST CORINTH, MAINE.

IMPROVEMENT IN HORSE-HOES.

Specification forming part of Letters Patent No. 34,128, dated January 14, 1862.

*To all whom it may concern:*

Be it known that I, MOSES CHANDLER, of East Corinth, in the county of Penobscot and State of Maine, have invented a new and Improved Horse-Hoe; and I do hereby declare that the following is a full, clear, and exact description of the same, reference being had to the accompanying drawings, making a part of this specification, in which—

Figure 1 is a plan or top view of my invention; Fig. 2, a side sectional view of the same, taken in the line $xx$, Fig. 1.

Similar letters of reference indicate corresponding parts in the two figures.

The object of this invention is to obtain an implement of simple construction, which may be adjusted so as to furrow land for planting, either in hills or drills, and form the furrows at a greater or less distance apart and at a greater or less depth, as may be desired, the implement also being designed to be capable of covering seed in the drills of a uniform depth and of any desired depth, and also to hoe and hill up growing crops.

The invention consists in the employment or use of two adjustable wings and two adjustable and yielding cultivator-blades, all arranged to operate as hereinafter set forth.

To enable those skilled in the art to fully understand and construct my invention, I will proceed to describe it.

A represents the beam of the implement, the back part of which has two handles, B B, attached to it, of the usual form.

C is a cross-bar, which is attached to the beam A at a point a short distance in front of the lower ends of the handles B B. This crossbar projects at equal distances from the beam A at each side, and on said bar C, at each side of the beam, there is fitted a spiral or coil, $a$, of a bar or rod, D, the inner ends of the spirals or coils being attached to the beam A, as shown at $b$. The spirals or coils $a$ form springs for the rods D, and each rod is wound around a bar, E, near each end of it, the rods being retained in proper place on bar E by pins $c$.

To the lower end of each rod D there is attached a cultivator-blade, F. Each rod D has a chain, G, attached to it, said chains being connected to the beam A. By taking up or lengthening these chains on the beam A the rods D may be more or less inclined, and the depth of the penetration of the blades F in the earth regulated as desired. Whiffletrees are attached to the ends of the cross-bar C.

H H represent two wings, each of which is formed of two parts, $d e$, connected together by a pivot or bolt, $f$. The wings H H are attached to curved or bent rods I J, which are secured to the under side of the beam A by eyes $g$ at the lower ends of screw-bolts K, which pass vertically through the beam, as shown clearly in Fig. 2. The front ends of the parts $d$ of the wings H are attached by joints $h$ to the rods I, so that said parts $d$ may be turned and adjusted more or less obliquely with the beam A, and the back ends of the parts $d$ are attached to the rods J by the pivots or bolts $f$, which pass through oblong slots $i$ in the lower parts of the rods J.

To the front end of each part $d$ of the wings there is attached a stay-rod, L. The front ends of the rods L are attached to the lower end of a bolt, M, which is fitted in a longitudinal slot, $j$, in the beam A.

The implement is used as follows: When drills are to be made the wings H H are adjusted so as to be nearly parallel with each other and at a distance apart corresponding with the required distance between the drills. This may be effected by adjusting the rods I J longitudinally in the eyes $g$ of the bolts K.

In forming or making furrows the cultivator-blades F may be drawn up free from the ground and retained in such position by the chains G.

In covering seed in drills the wings H H are placed in a more or less oblique position, and the back parts, $e$, of the wings are more or less elevated, according to the height of the ridge of earth required over the seed. The higher the back parts, $e$, of the wings H H are raised the higher the ridge of earth will be, and vice versa. The depth of the penetration of the parts $d$ of the wings H in the earth may be graduated by raising the back ends of the parts $d$, the slots $i'$ in the lower parts of the rods J admitting of such adjustment.

It will be seen that the wings H H will throw earth up to the growing plants, and when used for such purpose the cultivator-blades F F are lowered by lengthening the chains G, so that they may act upon the earth and serve to loosen or lighten up the same and deprive it of weeds. The springs of the rods D are sufficiently strong to allow the blades F to pass through the earth and perform their proper function; but they will yield or give in case the blades meet with any obstructions in the earth, and will therefore prevent the rods D being broken or injured, or any parts connected therewith being strained.

The blades F F may be adjusted at a greater or less distance apart by sliding the rods D on the bar E and securing them nearer together or farther apart by means of the pins c.

The stay-rods L are adjusted to suit the different adjustments of the wings H by means of the adjustable bolt M in the slot j of the beam.

Having thus described my invention, what I claim as new, and desire to secure by Letters Patent, is—

1. Attaching the wings H H of the implement to the beam A by means of the rods I J, which are fitted in eyes g at the ends of bolts K in the beam, in combination with the joints h, which connect the front ends of the parts d of the wings to the rods I, and the slots i in the lower parts of the rods J, through which the bolts f at the back ends of the parts d pass, whereby the wings may be adjusted, as and for the purposes set forth.

2. Forming the wings H H of two parts, d e, connected together by a pivot or bolt, f, for the purpose specified.

3. The adjustable and yielding cultivator-blades F, when arranged as shown, and used in connection with the wings H, for the purpose set forth.

4. In combination with the wings H, attached to the beam A, as shown, the stay-rods L and adjustable bolt M, arranged as shown, to insure the proper bracing of the wings H at all points of their adjustment, as described.

MOSES CHANDLER.

Witnesses:
  C. D. CHAPMAN,
  N. K. DEXTER.